US008465581B2

(12) United States Patent
Wescott et al.

(10) Patent No.: US 8,465,581 B2
(45) Date of Patent: Jun. 18, 2013

(54) STABLE ACID DENATURED SOY/UREA ADHESIVES AND METHODS OF MAKING SAME (75) Inventors: James M. Wescott, Waunakee, WI (US); Michael J. Birkeland, Egerton, WI (US)

(73) Assignee: Hercules Incorporated, Wilmington, DE (US)

( * ) Notice: Subject to any disclaimer, the term of this patent is extended or adjusted under 35 U.S.C. 154(b) by 6 days.

(21) Appl. No.: 12/869,848

(22) Filed: Aug. 27, 2010

(65) Prior Publication Data

US 2011/0048280 A1 Mar. 3, 2011

Related U.S. Application Data (60) Provisional application No. 61/237,813, filed on Aug. 28, 2009.

(51) Int. Cl.
*C08F 251/00* (2006.01)
(52) U.S. Cl.
USPC ........ 106/125.1; 527/301; 527/309; 527/312; 106/140.1; 106/148.1; 106/150.1
(58) Field of Classification Search
None
See application file for complete search history.

(56) References Cited

U.S. PATENT DOCUMENTS

| 1,724,695 | A | 8/1929 | Davidson |
| 1,813,387 | A | 7/1931 | Davidson et al. |
| 1,994,050 | A | 3/1935 | Satow ............................... 87/17 |
| 3,220,851 | A | 11/1965 | Rambaud et al. ................. 99/98 |
| 3,494,775 | A | 2/1970 | Coscia et al. .................. 106/124 |
| 6,497,760 | B2 | 12/2002 | Sun et al. ................... 106/131.1 |
| 7,252,735 | B2 | 8/2007 | Li ................................. 156/330 |
| 7,345,146 | B2 | 3/2008 | Wescott et al. ............... 528/230 |
| 2005/0166796 | A1* | 8/2005 | Sun et al. ................... 106/140.1 |
| 2008/0021187 | A1* | 1/2008 | Wescott et al. ............... 527/301 |

FOREIGN PATENT DOCUMENTS

| WO | 0159026 | 8/2001 |
| WO | 200801145 | 1/2008 |

OTHER PUBLICATIONS

Kinsella, J, American Oil Chemists' Society, Mar. 1979, vol. 56, p. 242-258.
H. H. Espy, "Alkaline-Curing Polymeric Amine-Epichlorohydrin Resins", in Wet Strength Resins and their Application, L. L. Chan, Ed., TAPPI Press, Atlanta GA, pp. 13-44 (1994).

* cited by examiner

*Primary Examiner* — Melvin C Mayes
*Assistant Examiner* — Colette Nguyen
(74) *Attorney, Agent, or Firm* — Michael J. Herman; Joanne Rossi; Shaorong Chen (57) ABSTRACT

The present invention provides an improved method of producing a stable acid denatured soy/urea adhesive having improved wet and dry strengths, with more efficient production and lower production costs. The method comprises combining urea with soy flour that has been acid treated until denatured and substantially free from urease activity. The soy flour is preferably lowered to a pH of 2.0 to 4.0 for at least 1 minute. Optionally, the method may also include adding a crosslinking agent, diluent or both to the soy flour/urea adhesive and/or adding an emulsified or dispersed polymer. Adhesives and dispersions prepared according to the methods of this invention offer increased stability and strength properties.

18 Claims, 3 Drawing Sheets

12HU vs 12AUB (54% Solids) viscosity and viscosity stability at room temperature

FIG 1

Figure 1: 12HU vs 12AUB (54% Solids) viscosity and viscosity stability at room temperature

FIG 2

Figure 2: 12HU vs 12AUB (54% Solids) pH and pH stability at room temperature

FIG 3

Figure 3: pH and viscosity stabilities of Example 7 (11ABU-50)

FIG 4

Figure 4: Viscosity stability of examples 10 (50-pMDI) and 11 (100-pMDI) at room temperature

FIG 5

Figure 5: Cure rate curves

STABLE ACID DENATURED SOY/UREA ADHESIVES AND METHODS OF MAKING SAME

This application claims the benefit of provisional application No. U.S. 61/237,813, filed Aug. 28, 2009, the entire contents of which are hereby incorporated by reference.

FIELD OF THE INVENTION

The present invention provides a composition and method of making a stable adhesive by combining urea and soy flour that has been acid denatured and substantially free of urease to form a stable soy/urea adhesive.

BACKGROUND OF THE INVENTION

Adhesives derived from protein-containing soy flour first came into general use during the 1920's (see, e.g., U.S. Pat. Nos. 1,813,387, 1,724,695 and 1,994,050). Soy flour suitable for use in adhesives was, and still is, obtained by removing some or most of the oil from the soybean, yielding a residual soy meal that was subsequently ground into extremely fine soy flour. Typically, hexane is used to extract the majority of the non-polar oils from the crushed soybeans, although extrusion/extraction methods are also suitable means of oil removal.

The resulting soy flour was then, generally, denatured (i.e., the secondary, tertiary and/or quaternary structures of the proteins were altered to expose additional polar functional groups capable of bonding) with an alkaline agent and, to some extent, hydrolyzed (i.e., the covalent bonds were broken) to yield adhesives for wood bonding under dry conditions. However, these early soybean adhesives exhibited poor water resistance, strictly limiting their use to interior applications.

In addition, soybean adhesives common in the prior art exhibit a limited pot life. After only a few hours, the viscosity and performance of the alkaline-denatured soy flour mixture rapidly decreases. This reduction in performance is believed to be a result of some hydrolysis of the soy flour and the excessive breakdown of the secondary, tertiary and quaternary structures deemed to be important for the formation of both strong adhesive and cohesive bonds. Thus, a need exists for an adhesive demonstrating a balance between exposing sufficient functional groups for improved performance while retaining enough protein structure to maintain adhesive performance and offering stability.

In the 1920's, phenol-formaldehyde (PF) and urea-formaldehyde (UF) adhesive resins were first developed. Phenol-formaldehyde and modified urea-formaldehyde resins were exterior-durable, but had high raw materials costs that initially limited their use. World War II contributed to the rapid development of these adhesives for water and weather resistant applications, including exterior applications. However, protein-based adhesives, mainly soy-based adhesives that were often combined with blood or other proteins, continued to be used in many interior applications.

Currently, interior plywood, medium-density fiberboard (MDF) and particleboard (PB) are primarily produced using urea-formaldehyde resins. Although very strong, fast curing, and reasonably easy to use, these resins lack hydrolytic stability along the polymer backbone. This causes significant amounts of free formaldehyde to be released from the finished products (and ultimately, inhaled by the occupants within the home). There have been several legislative actions to push for the reduction of formaldehyde emissions when used in interior home applications (Health and Safety Code Title 17 California Code of Regulations Sec. 93120-93120.12, and the new United States national standard—Reference: 2010 U.S. S1660).

Soy-based adhesives can use soy flour, soy protein concentrates (SPC), or soy protein isolates (SPI) as the starting material. For simplicity, the present disclosure refers to all soy products that contain greater than 20% carbohydrates as "soy flour". Soy flour is less expensive than SPI, but soy flour contains significant levels of activated urease (an enzyme that rapidly and efficiently decomposes urea into ammonia), thus requiring a need for the urease to be deactivated when using urea in the final adhesive. This needs to be accomplished without compromising the viscosity/solids ratio or performance of the final product. Soy flour also contains high levels of carbohydrates, requiring more complex crosslinking technique, as crosslinking results in the much improved water resistance of the soy-based adhesives.

SPC contains a greater amount of protein than soy flour, but contains less protein than SPI. Typically, SPC is produced using an alcohol wash to remove the soluble carbohydrates.

SPI is typically produced through an isoelectric precipitation process. This process not only removes the soluble sugars but also removes the more soluble low molecular weight-proteins, leaving behind mainly high molecular weight-proteins that are optimal for adhesion even without modification. As a result, SPI makes a very strong adhesive with appreciable durability. However, SPI is quite costly, and is therefore not an ideal source of soy for soy-based adhesives. Thus, there is a strong need to produce high quality adhesives from soy flour.

U.S. Pat. No. 7,252,735 to Li et al. (Li) describes soy protein crosslinked with a polyamido-amine epichlorohydrin-derived resin (PAE). Li describes these particular PAEs, which are known wet strength additives for paper, in many possible reactions with protein functional groups. In Li, SPI is denatured with alkali at warm temperatures and then combined with a suitable PAE resin to yield a water-resistant bond. This aqueous soy solution must be prepared just prior to copolymerization (or freeze-dried) to allow for a suitable pot life. Li does not teach or suggest the importance of denaturing soy for use with PAE, as the SPI used in Li already has an extensive thermal history. Moreover, the alkali process described by Li is not sufficient to deactivate the urease in soy flour and is, therefore, not a suitable approach to make soy flour/urea adhesives. Furthermore, the adhesives described by Li suffer from at least one of the following: high viscosity, low solids, or poor stability.

U.S. Pat. No. 6,497,760 to Sun et al. (Sun) also teaches soy-based adhesives made from SPI as a starting material. Sun teaches that the SPI can be modified with urea, but Sun does not teach or suggest modifying soy flour with urea to provide an improved soy flour-based adhesive. Urea is a known denaturant for adhesives having no significant urease activity, such as SPI. However, urea is problematic for soy flours as they contain moderate to high levels of urease activity. While it is known that SPI can be denatured with urea (see, e.g., Kinsella, J. Am. Oil Chem. Soc., March 1979, 56:244), Sun teaches away from using urea with soy flour because of the urease activity associated with it.

There is very limited previous work the describes any method(s) to deactivate the urease in soy flour and there is no such work that describes this particular acid treatment approach.

U.S. Pat. No. 3,220,851 to Rambaud describes a method of treating soya beans to improve their quality and usability in food processing. Rambaud describes cooking the soya in an aqueous solution to temperatures not to exceed 80° C. so as to remove the "undesirable" compounds such as urease and antitrypsin from the soya. Rambaud specifically teaches that the temperature of 80° C. constitutes a threshold value beyond which the speed of the degradation of the albumins increases rapidly, and it is therefore essential not to exceed this value. Rambaud also does not teach or suggest why removing urease or antitrypsin may be useful for the soya beans with respect to their ability to serve as adhesives.

Wescott (U.S. application Ser. No. 11/779,558) also teaches a higher temperature method for treating soy to deactivate the urease. This method, although effective in deactivating the urease, is inferior to this invention in that results in a significant increase in viscosity and color as compared to this invention.

U.S. Pat. No. 7,345,136 to Wescott describes a method for denaturing soy flour in preparation for copolymerization by the direct addition of formaldehyde. Such a method, if applied to this invention would result in high ammonia levels and significant performance decreases. Alternatively, if the method of this invention is applied to the process of Wescott (U.S. Pat. No. 7,345,136) immediate gelation is realized when formaldehyde is added to the denatured soy flour. This is a result of an insufficient level of denaturation for the process.

SUMMARY OF THE INVENTION

The present invention provides a method of making stable adhesives by combining soy flour that has been acid denatured and substantially free of urease activity and urea to form a stable soy/urea adhesive. The present invention also provides for a stable composition comprising soy flour that is acid denatured and substantially free of urease and urea.

In one embodiment of the present invention, the soy flour is dispersed in water and the pH is lowered through the isoelectric point to a pH of less than 4.5, preferably less than 4.0, but greater than 2.0 and allowed to stir for at least 1 minute. This acid denatured soy is then substantially free of urease as determined by the pH stability after the addition of urea (i.e. no ammonia formation). Urea can then be added to the material at any pH after this acid denaturing stage.

The pH of the final adhesive composition, either with or without added crosslinker can range from 2-10. Preferably, from 3.5-8.0. Typically, the pH is adjusted to control the reaction rate or stability of the final adhesive. Any suitable acid or base may be used to alter the pH.

The acid denaturing is typically conducted at room temperature, but it is reasonable to conduct the denaturing step at any temperature between 5-50° C.

The soy/urea adhesive may further include a crosslinking agent, an emulsified polymer, a diluent, or any combination thereof.

In the present invention, adding urea to soy flour that has been acid denatured and substantially free of urease yields a soy/urea adhesive with one or more of the following properties: excellent stability, compatibility, dry or wet strength and biological resistance. Additionally, the present invention results in much lighter colored adhesives and significantly higher solids (25% higher) than previously reported.

Further, the present invention advantageously uses regular high PDI Baker's-grade soy flour, available at a much lower cost than conventional sources of soy protein for adhesives. Typically, regular Baker's-grade soy flour does not offer any appreciable adhesive capabilities unless a denaturing step and/or crosslinking agent are used. Advantageously, the present invention demonstrates that urea can be used very effectively to provide additional denaturing and solvation to the acid denatured soy flour. The present invention provides a stable acid denatured soy/urea adhesive that exhibits improved properties even without a crosslinking agent.

In fact, the stable acid denatured soy flour-based adhesives of the present invention offer excellent resistance to biological attack for at least several months.

The novel methods of the present invention provide stable soy/urea adhesives and adhesive dispersions having several advantages over the prior art. First, the adhesives/dispersions of the present invention have much lower viscosities as compared to other urea containing soy-based adhesives at the same solids content, which allows for easy transfer and applications. Second, the adhesives of the present invention are much lighter in color. Third, the adhesives of the present invention have a much higher percent soy solids; up to 25% higher solids as compared to heat treated denatured products having the same viscosity. Fourth, the adhesives of the present invention demonstrate a superior shelf life with certain crosslinking agents.

DETAILED DESCRIPTION OF THE INVENTION

In the specification and in the claims, the terms "including" and "comprising" are open-ended terms and should be interpreted to mean "including, but not limited to . . ." These terms encompass the more restrictive terms "consisting essentially of and "consisting of."

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The present invention provides a novel adhesive and adhesive dispersion produced by combining urea with soy flour, where the soy flour has been acid denatured and substantially free of urease activity. The urea may be added to the acid denatured soy flour with no urease degradation of the urea, and thus, a stable product can be produced.

By "stable" we mean an adhesive that remains viscous and pH-stable for extended periods of time at room temperature. By "pH stable" we mean that the pH stays within one unit for at least twenty days. By "viscous stable" we mean that the Brookfield viscosity of the adhesive will remain within 25% of its initial viscosity for 5 hours or, as measured after 24 hours, will remains within 35% of its initial viscosity for at least 7 days.

By "denatured" we mean proteins that have lost some of their structure (quaternary, tertiary and secondary structure) through the application of some external stress or compound, such as, for example, treatment of proteins with strong acids or bases, high concentrations of inorganic salts, organic solvents (e.g., alcohol or chloroform), or heat. Soy flour, when properly denatured, is an excellent adhesive. Once denatured, proteins contained within the soy flour "uncoil" from their native structure, thereby exposing the more hydrophilic groups of the protein backbone.

By "substantially free" we mean that conventional tests will not recognize any significant amounts of urease present in the heated soy flour, typically measured by a change in pH over time. Thus, soy flours that are "substantially free" of urease activity will exhibit a pH change of less than one unit over twenty days in the presence of urea at room temperature.

While a soy flour that is substantially free of urease is denatured, a soy flour that has been denatured is not necessary substantially free of urease. The novelty of the present invention is that the inventors have determined that a slight acid denaturing stage is sufficient to denature a soy flour in such a way as to render the soy flour substantially free of urease, and therefore useful for the stable soy/urea adhesive. Interestingly, a slight or even extreme base denaturing process is NOT effective in deactivating the urease.

By "acid denatured" we mean lowering the pH of the soy flour to less than 4.5, preferably to 4.0, but not lower than 2.0 for a period of at least 1 minute.

One aspect of the present invention provides a method for making a stable adhesive, the method comprising the steps of providing an aqueous suspension of soy flour, lowering the pH of the soy flour to less than 4.5, preferably 4.0 or less until denatured and substantially free of urease; and adding urea to the soy flour, wherein a stable aqueous soy/urea adhesive is fanned. Generally the soy flour is denatured in less than 30 minutes, preferably less than 15 minutes. The soy flour can be acid treated for longer than 30 minutes.

The present invention yields stable aqueous soy/urea adhesives regardless of the PDI of the soy flour used. The Protein Dispersibility Index (PDI) is a means of comparing the solubility of a protein in water, and is widely used in the soybean product industry. A sample of the soybeans are ground, mixed with a specific quantity of water, and then blended together at a specific rpm for a specific time. The protein content of the resulting mixture and original bean flour are then measured using a combustion test, and the PDI is calculated as the percentage of the protein in the mix divided by the percentage in the flour. For instance, a PDI of 100 indicates total solubility. PDI is affected not only by the type of soybean used, but also by any manufacturing processes used on the soy. For instance, heat can lower the PDI of a soybean sample. The PDI required of a soy flour is dependent on the purpose to which the soybeans are to be put. The utility of the present invention is that the soy/urea adhesive of the present invention can use either high or low PDI soy flour to yield the stable adhesives of the present invention. The acid denaturing stage is so effective that even flours with high levels of urease (high PDI) are equally as effective and may even be preferred in some cases.

It is absolutely essential to lower the pH of the soy flour of the present invention until acid denatured and substantially free of urease. The acid used to treat the soy flour may be of either a Bronsted or Lewis acid classification. The use of common mineral acids, such as sulfuric, nitric, phosphoric or hydrochloric acid is preferred.

Conventional heat-denatured soy flour exhibits very high viscosities and low solids contents, making it difficult to transport and store. The acid denatured soy/urea adhesives are substantially higher in solids and lower in viscosity than heat treated similar composition adhesives. The solids content of denatured soy/urea adhesives in some cases can be more than 25% greater than the heat denatured products with similar compositions while maintaining a similar viscosity.

The amount of urea added to the soy flour depends on the needs of the soy/urea adhesive or dispersion. For instance, the urea content may be adjusted to control the flow characteristics or glass transition temperature ($T_g$) of the final adhesive. This allows the adhesive/dispersion of the present invention to be spray dried and converted into a usable powder adhesive resin.

In one embodiment, the amount of urea added to the soy flour can be from about five parts urea to one part soy flour (solids/solids) to about 0.1 parts urea to one part soy flour (solids/solids); most preferably between two parts urea to one part soy flour to about 0.5 parts urea to one part soy flour. The soy flour can be acid denatured before, during or after the addition of the urea. Preferably the soy flour is acid denatured before the addition of urea, but with low PDI flours, it is possible to reverse the order of addition.

The adhesive of the present invention can be added to any emulsion polymer, such as, for example, polyvinyl acetate (PVAc) emulsions, to yield a stable adhesive dispersion. The emulsion polymer is added at a level of 0.1 to 80% by dry solids weight based on the dry solids weight of the total adhesive (total adhesive is the adhesive formulation, including but not limited to, soy, urea, any added crosslinker, and any added diluent). By "emulsion" we mean a suspension of small globules of one liquid in a second liquid where the first liquid will not mix (i.e., oil in vinegar). By "dispersion" we mean a two-phase adhesive system in which one phase is suspended in a liquid. For the sake of convenience, the emulsion or dispersion of the present invention is referred to throughout this document as an "adhesive dispersion" or "dispersion." This is not meant to limit the scope of the invention, but is merely for ease of reading.

Typically, adding unmodified soy flour or NaOH-denatured soy flour directly to emulsified polymer yields resins having poor stability and compatibility. In contrast, adding the stable acid denatured soy/urea adhesive of the present invention to an emulsion or dispersed polymer yields a stable, highly compatible adhesive dispersion useful in many industrial applications. Further, the combination is accomplished by simple blending techniques using commercial mix tanks, thin tanks or reactors known to one of skill in the art. The temperature of the blend is not considered to be critical and room temperature is typically employed, although it may be desirable and acceptable to combine the stable soy/urea adhesive of the present invention with the emulsion or dispersed polymer at higher temperatures depending on the needs of the user. The adjustment of the final pH with acids or bases may be required to ensure optimal stability of the dispersion. However, these adjustments are typically quite modest and are known to one of skill in the art. For instance, minor adjustments necessary for the stability of the emulsion or dispersion may be desired.

The stable acid denatured soy/urea adhesive of the present invention may be used as is or may be further improved by adding a suitable crosslinking agent(s). Crosslinking agents are typically added to resins and adhesives to provide additional or manipulate existing properties of the adhesive, such as water resistance, solubility, viscosity, shelf-life, elastomeric properties, biological resistance, strength, and the like. The role of the crosslinking agent, regardless of type, is to incorporate an increase in the crosslink density within the adhesive itself. This is best achieved with crosslinking agents that have several reactive sites per molecule.

The type and amount of crosslinking agent used in the stable acid denatured soy/urea adhesive of the present invention depends on what properties are desired. Additionally, the type and amount of crosslinking agent used may depend on the characteristics of the soy flour used in the adhesive.

Any crosslinking agent known to the art may be used in the method of the present invention. For instance, the crosslinking agent may or may not contain formaldehyde. Although formaldehyde-free crosslinking agents are highly desirable in many interior applications, formaldehyde-containing crosslinking agents remain acceptable for some exterior applications.

Possible formaldehyde-free crosslinking agents for use with the adhesives of the present invention include isocyanates such as polymeric methyl diphenyl diisocyanate (pMDI) and polymeric hexamethylene diisocyanate (pHMDI), amine-epichlorohydrin adducts, epoxy, aldehyde and urea-aldehyde resins capable of reacting with soy flour. When a formaldehyde-free crosslinking agent is employed in the invention, it is used in amounts ranging from 0.1 to 80% on dry weight basis of the total dry adhesive. (total adhesive is the adhesive formulation, including but not limited to, soy, urea, any added crosslinker, and any added diluent) A preferred formaldehyde-free crosslinking agent comprises a polyamidoamine epichlorohydrin (PAE) and is used in amounts ranging from 0.1 to 80% by dry weight.

Amine-epichlorohydrin resins are defined as those prepared through the reaction of epichlorohydrin with amine-functional compounds. Among these are polyamidoamine-epichlorohydrin resins (PAE resins), polyalkylenepolyamine-epichlorohydrin (PAPAE resins) and amine polymer-epichlorohydrin resins (APE resins). The PAE resins include secondary amine-based azetidinium-functional PAE resins such as Kymene™ 557H, Kymene™ 557LX, Kymene™ 617, Kymene™ 624 and Hercules CA1000, all available from Hercules Incorporated, Wilmington Del., tertiary amine polyamide-based epoxide-functional resins and tertiary amine polyamidourylene-based epoxide-functional PAE resins such as Kymene™ 450, available from Hercules Incorporated, Wilmington Del. A suitable crosslinking PAPAE resin is Kymene™ 736, available from Hercules Incorporated, Wilmington Del. Kymene™ 2064 is an APE resin that is also available from Hercules Incorporated, Wilmington Del. These are widely used commercial materials. Their chemistry is described in the following reference: H. H. Espy, "Alkaline-Curing Polymeric Amine-Epichlorohydrin Resins", in *Wet Strength Resins and Their Application*, L. L. Chan, Ed., TAPPI Press, Atlanta Ga., pp. 13-44 (1994). It is also possible to use low molecular weight amine-epichlorohydrin condensates as described in Coscia (U.S. Pat. No. 3,494,775) as formaldehyde-free crosslinkers.

Possible formaldehyde-containing crosslinking agents include formaldehyde, phenol formaldehyde, urea formaldehyde, melamine urea formaldehyde, melamine formaldehyde, phenol resorcinol and any combination thereof. When formaldehyde-containing crosslinking agents are employed in the invention they are used in amounts ranging from 1 to 80% of the total adhesive composition based on dry weight. (total adhesive is the adhesive formulation, including but not limited to, soy, urea, any added crosslinker, and any added diluent) In one embodiment of the invention, the crosslinking agent comprises phenol formaldehyde in amounts ranging from 1 to 80%, on dry weight.

Regardless of the specific crosslinking agent(s) used, the crosslinking agent is typically added to the acid denatured soy/urea adhesive just prior to use (such as in making a lignocellulosic composite), but may be added days or even weeks prior to use in some situations.

In some applications, it may be desirable to add a diluent to better solvate, further denature or otherwise modify the physical properties of the acid denatured soy/urea adhesive/dispersion. Possible diluents/modifiers include polyols such as glycerol, ethylene glycol, propylene glycol, neopentyl glycol, polymeric version thereof, or any other hydroxyl-containing monomer or polymeric material available, defoamers, wetting agents and the like that are commonly employed in the art. Other diluents that serve only to extend the solids are also acceptable, such as flours, tales, clays and the like.

These diluents/modifiers may be incorporated at levels ranging from 0.1 to upwards of 70% by weight of the total adhesive based on dry weight of solids. These may be incorporated during any step of the process including before, during or after the urease deactivation heating step.

The use of traditional soy protein modifiers may be used, as well; such as the addition of sodium bisulfite to reduce the viscosity by reduction of disulfide bonds.

The final pH of the acid denatured soy/urea adhesives of the present invention can be adjusted with any suitable Bronsted of Lewis acid or base. The final pH of the acid denatured soy/urea adhesive is less than ten, preferably less than 7 and greater than 2.0, preferably greater than 3.0. In one version, adhesives having a pH of between three and seven exhibit optimum stability and compatibility. One of skill in the art will understand how to both manipulate the pH of the adhesive (described in the examples below) and what applications require an adhesive having a higher or lower pH. A unique aspect of the present invention is the wide range of usable pH values. Typically, the final pH will be selected based on the application or the type of crosslinker used. For example, with PF and PAE resins, higher pH soy/urea adhesives will be preferred and for pMDI and UF or MUF resins, lower pH soy/urea adhesives will be preferred. Although for PF dispersions, a low pH may be preferred.

The method of the present invention may also include adding a spray- or freeze-drying step to produce a powder adhesive.

The stable soy/urea adhesive of the present invention can be used in many industrial applications. For instance, the adhesive may be applied to a suitable substrate in amounts ranging from 1 to 25% by dry weight (1 part dry adhesive per 100 parts substrate to 25 parts dry adhesive per 100 parts substrate), preferably in the range of 1 to 10% by weight and most preferably in the range of 2 to 8% by weight. Examples of some suitable substrates include, but are not limited to, a lignocellulosic material, pulp or glass fiber. The adhesive can be applied to substrates by any means known to the art including roller coating, knife coating, extrusion, curtain coating, foam coaters and spray coaters such as a spinning disk resin applicator.

One of skill will understand how to use adhesives/dispersions of the present invention to prepare lignocellulosic composites using references known to the field. See, for example, "Wood-based Composite Products and Panel Products", Chapter 10 of *Wood Handbook—Wood as an Engineering Material*, Gen. Tech. Rep. FPL-GTR-113, 463 pages, U.S. Department of Agriculture, Forest Service, Forest Products Laboratory, Madison, Wis. (1999). A number of materials can be prepared using the adhesive/dispersion of the invention including particleboard, oriented strand board (OSB), waferboard, fiberboard (including medium-density and high-density fiberboard), parallel strand lumber (PSL), laminated strand lumber (LSL), oriented strand lumber (OSL) and other similar products. Lignocellulosic materials such as wood, wood pulp, straw (including rice, wheat or barley), flax, hemp and bagasse can be used in making thermoset products from the invention. The lignocellulosic product is typically made by blending the adhesive with a substrate in the form of powders, particles, fibers, chips, flakes fibers, wafers, trim, shavings, sawdust, straw, stalks or shives and then pressing and heating the resulting combination to obtain the cured material. The moisture content of the lignocellulosic material should be in the range of 2 to 20% before blending with the adhesive of the present invention.

The adhesive of the present invention also may be used to produce plywood or laminated veneer lumber (LVL). For instance, in one embodiment, the adhesive may be applied onto veneer surfaces by roll coating, knife coating, curtain coating, or spraying. A plurality of veneers is then laid-up to fowl sheets of required thickness. The mats or sheets are then placed in a press (e.g., a platen), usually heated, and compressed to effect consolidation and curing of the materials into a board. Fiberboard may be made by the wet felted/wet pressed method, the dry felted/dry pressed method, or the wet felted/dry pressed method.

In addition to lignocellulosic substrates, the adhesives of the present invention can be used with substrates such as plastics, glass wool, glass fiber, other inorganic materials and combinations thereof.

The following examples are, of course, offered for illustrative purposes only, and are not intended to limit the scope of the present invention in any way. Indeed, various modifications of the invention in addition to those shown and described herein will become apparent to those skilled in the art from the foregoing description and the following examples and fall within the scope of the appended claims.

EXAMPLES AND EVALUATION METHODOLOGIES

The following characteristics of the acid denatured soy flour/urea adhesives were evaluated:

1) Physical Properties—Brookfield viscosity (RV @ 10 RPMs in all cases) with the spindle selection depending upon the viscosity of the product, pH, and room temperature stability (viscosity and biological—as determined by the obvious onset of the soy rotting or spoiling similar to milk). To reduce the impact of a temporary viscosity increase due to the, often, thixotropic nature of soy adhesives, the adhesive is rapidly stirred for 30 seconds prior to any viscosity measurement.

2) Dry strength development—Shear strength of two plys pressed using the Automated Bonding Evaluation System (ABES) from AES, Inc. This is used for determining the strength of the adhesive bond as developed over time under specific pressing times/temperatures. In all examples 120° C. was used. The results are plotted relative to press time to determine the relative strength development of different adhesives as a function of time. Specimens are prepared and tested in accordance with the ABES Procedure.

3) Adhesive Bond Strength—As determined by the following ABES procedure: ABES Procedure.

Sample Preparation: Wood samples were stamped out using the Automated Bonding Evaluation System (ABES) stamping apparatus from maple veneers such that the final dimensions were 11.7 cm along the grain, 2.0 cm perpendicular to the grain and 0.08 cm thick. The adhesive to be tested was applied to one end of the sample such that the entire overlap area is covered, generally being in the range of 3.8-4.2 $mg/cm^2$ on a wet basis. The sample was then bonded to a second veneer (open time of less than 15 seconds to ensure excellent transfer) and placed in the ABES unit such that the overlap area of the bonded samples was 1.0 cm by 2.0 cm. Unless otherwise noted, all samples were pressed for 2.0 minutes at 120° C., with 9.1 $kg/cm^2$ of pressure. All bonded samples were then allowed to condition for at least 48 hours in a controlled environment at 22° C. and 50% relative humidity.

Strength Testing: For each resin, ten samples were prepared in the manner described above. After conditioning, five of the ten samples were tested using the ABES instrument in the dry condition. Maximum load upon sample breakage was recorded. These were termed the dry strength samples. The remaining five samples were placed in a water bath at 22° C. for four hours. The samples were removed from the water bath and immediately tested in the manner described above. These samples were termed the wet samples. For each resin, the value reported is an average of the five samples. The error reported is the standard deviation. Typical coefficients of variations (COVs) for this method are around 15% for both dry and wet evaluations; this is considered to be excellent in light of the variability within the wood itself.

4) Particleboard Procedure: The purpose of this procedure is to outline the approved process for preparing particleboard using a 48" diameter rotary blender with an air atomizer with 50"×50" steam heated press. The target density and thickness for these panels was 46 PCF with a thickness of ¾". Face to core ratio was 40/60. Furnish was mixture of various western species (Roseburg Forest Products, 1.5-4.0% MC). The following procedure was followed to prepare particleboard: Weigh the face furnish into an approved container and load into the drum of the 48" diameter blender. Weigh the resin such that 7.0% solid resin to dry furnish is used (nearest 0.0 g) and pour into the funnel attached to the blender spray assembly. Turn on the atomizer air and adjust to 40 psi. Spray until all the resin/additive has left the funnel and hose. Allow the blender to tumble for at least 5 minutes to distribute the remaining atomized resin. Remove furnish from blender and place into a well-labeled container. Take the mat moisture content of this resinated furnish. Repeat for core layer and with calculated load of 7.0% dry resin to dry wood basis. Place release paper on a lab caul plate and a 22"×22" forming box on top of the release paper. Weigh furnish for the first face layer to the nearest 0 g. Form the face layer by manually spreading the furnish across the caul plate using a wide tined comb to evenly distribute the furnish. It is important that the layer be as evenly spread as possible to avoid density distribution issues. Weigh the core furnish to the nearest 0 g (middle layer). Form the core layer by manually spreading the furnish across the top of the face layer using a wide tined comb to evenly distribute the furnish. It is important that the layer be as evenly spread as possible to avoid density distribution issues. Weigh furnish for the last face layer to the nearest 0 g. Form the face layer by manually spreading the furnish across the top of the core layer using a wide tined comb to evenly distribute the furnish. It is important that the layer be as evenly spread as possible to avoid density distribution issues. Place the cover inside the forming box on top of the 3 layer formed mat and manually press down firmly for 15 seconds. While continuing to hold down the cover, carefully lift off the forming box exposing the mat. Then carefully remove the cover. Place the second piece of release paper (shiny side down) and caul plate on top of the formed mat. Place the formed mat onto the loading area of the press and slide into the press using a push stick. Verify the temperature of the press platens is 170° C. Press the CLOSE and CLOSE CONFIRM buttons simultaneously on the PressMAN™ system (as supplied by the Alberta Research Council). The press should begin its cycle. Hold at thickness for such that the core is above 100° C. for 60 seconds as measured using the PressMAN™ temperature/pressure probe. Once the time at temperature has been reached, move cycle to degas phase and the press with open once the full cycle is complete. Remove the board immediately using a push stick. Place the panels in an insulated box (hot box) for 24 hours. Remove the boards from the hot-box and trim to 20"×20". Calculate the density for each board by measuring the thickness of the board at each corner approximately 2" from the edges and at one point in the middle. Obtain an average thickness using these values and calculate the volume of the board. Weigh the board to obtain the mass and calculate the density as mass/volume in units of lb/ft$^3$. Label and cut the boards for samples to such that each panel yields five MOR/MOE samples and eight internal bond (IB) samples. Condition all testing samples for at least 48 hours in an environmentally controlled room at 80° F. and 30% relative humidity prior to testing.

Raw materials for these examples are as follows: Soy Flour: Soy Flour-90 supplied by Cargill (Minneapolis, Minn.) 90 PDI, 200 mesh; Soy Flour-TS supplied by ADM (Decator, Ill.) 20 PDI, 100 mesh, Urea (Commercial Grade) purchased from Univar; PAE, Hercules Calif. 1300, supplied by Hercules, pH 3.5, solids=30%; pMDI was Rubunate™ FC3345, Huntsman International, Woodlands, Tex.; Advantage™ 357 defoaming agent, supplied by Hercules Incorporated. PVAc: Duracet supplied Franklin.

Examples are listed in tables and figures according to the following nomenclature: Soy:urea level (12=1 part soy to 2 parts urea), process step order of use: H=heat, A=acid addition, B=base addition, U=urea addition, lastly the % theoretical solids is provided. For example 12AUB-54 represents a product that has 1 part soy to 2 parts urea and was produced by the addition of acid, followed by urea, then base and was produced at 54% theoretical solids.

Example 1

Comparative Example #1

Non-Denatured Soy/Urea Adhesive (11U-26)

Soy flour when combined in water contains a significant amount of active urease that rapidly reacts with urea to produce ammonia. The ammonia is observed through a rapid pH increase to a pH of around 9 and then by the evolution of ammonia gas from the system. In one example, a 15% solution of Soy Flour-90 was prepared at room temperature with a pH of 6.2. Urea was added at an approximate amount of 1 part urea to 1 part soy flour and the pH rose to 8.90 in less than 10 minutes. After 20 minutes the pH was 9.2 with a very strong ammonia smell. This sample is not stable and is not considered acceptable.

Example 2

Comparative Example #2

Heat Denatured Soy/Urea Adhesive (12HU-54)

Soy flour was heat-denatured and then combined with urea to produce stable soy/urea aqueous products per the method described by Wescott (U.S. application Ser. No. 11/779,558). The formula used for this experiment is provided in Table 1.

Preparation Procedure: Water was charged into a three-neck round bottom flask equipped with a heating mantle, temperature controller, reflux condenser and mechanical stirrer. The sodium bisulfate was added to the water at room temperature followed by the addition of the soy flour over a period of five minutes. The mixture was stirred for five minutes to homogeneity and then heated to 82° C. denaturing temperature over thirty minutes. The reaction was held at the set temperature +/−1.0° C. for one hour with stirring at which time the heat was removed and the urea was added to the heat denatured soy and held for an additional 15 minutes with stirring. The addition of the urea cooled the soy adhesive to 44° C. The reaction was further cooled to 25° C. on ice/water bath and stored for use in plastic bottles at room temperature.

TABLE 1

Formula for Example 2

| Sequence | Ingredient | Amount (g) | Solids (g) | % to Soy |
|---|---|---|---|---|
| 01 | Water | 563.2 | 0 | |
| 02 | Sodium bisulfite | 1.12 | 1.12 | 0.50 |
| 03 | Soy Flour-TS | 236.8 | 225.0 | |
| 04 | Urea | 450.0 | 450.0 | 200 |
| Totals | | 1251.1 | 676.1 | |
| % Solids | | | 54.0 | |

QC: pH=6.91, Viscosity=5320 cP (w/#5 spindle)

Example 3

Acid Denatured Adhesive—Soy/Urea=1:2 @ 54% Total Solids (12AU-54)

Soy flour was acid-denatured and then combined with urea to produce a stable soy/urea aqueous product. The formula used for this experiment is provided in Table 2.

Preparation Procedure: Water was charged into a three-neck round bottom flask equipped with an overhead mechanical stirrer. The sodium bisulfite was added to the room temperature water followed by the addition of the soy flour over a period of five minutes. The mixture was stirred for 30 minutes at room temperature (Viscosity=2800 cP w/RV#5, pH=6.03). The acid (50% sulfuric acid) was then added dropwise to the rapidly stirring mixture until a pH of 3.0 (referred to as the acid denatured pH) was reached and, subsequently, held for an additional 30 minutes. The urea was then quickly added to the rapidly stirring acid denatured soy mixture and allowed to stir for 5 minutes. The addition of the urea cooled the soy adhesive; so the adhesive was warmed to 25° C. with a water bath and stored for use in plastic bottles while being maintained at room temperature. The product was a very homogenous, light tan, creamy product that had some foam present on the top.

TABLE 2

Formula for Example 3

| Sequence | Ingredient | Amount (g) | Solids (g) | % to Soy |
|---|---|---|---|---|
| 01 | Water | 563.2 | 0 | |
| 02 | Sodium bisulfite | 1.12 | 1.12 | 0.50 |
| 03 | Soy Flour-90 | 236.8 | 225.0 | |
| 04 | $H_2SO_4$ (50%) | 22.7 | 11.3 | 5.0 |
| 05 | Urea | 450.0 | 450.0 | 200 |
| Totals | | 1273.8 | 687.4 | |
| % Solids | | | 54.0 | |

Final Properties: pH=3.92, Viscosity=2180 cP (spindle #4)

Example 4

Acid Denatured Adhesive—Soy/Urea=1:2 @ 54% Total Solids (12AUB-54)

To the resin produced in example 3, base (50% NaOH) was added slowly to the rapidly stirring adhesive to raise the pH to 7.

TABLE 3

Formula for Example 4

| Sequence | Ingredient | Amount (g) | Solids(g) | % to Soy |
|---|---|---|---|---|
| 01 | Example 3 | 630 | 340.2 | |
| 02 | NaOH (50%) | 18.2 | 9.1 | 2.7 |
| Totals | | 648.2 | 349.3 | |
| % Solids | | | 53.9 | |

Final Properties: pH=7.07, Viscosity=1820 cP (spindle #4)

Discussion of Example 4 and Example 2 Comparison

Figure 1:
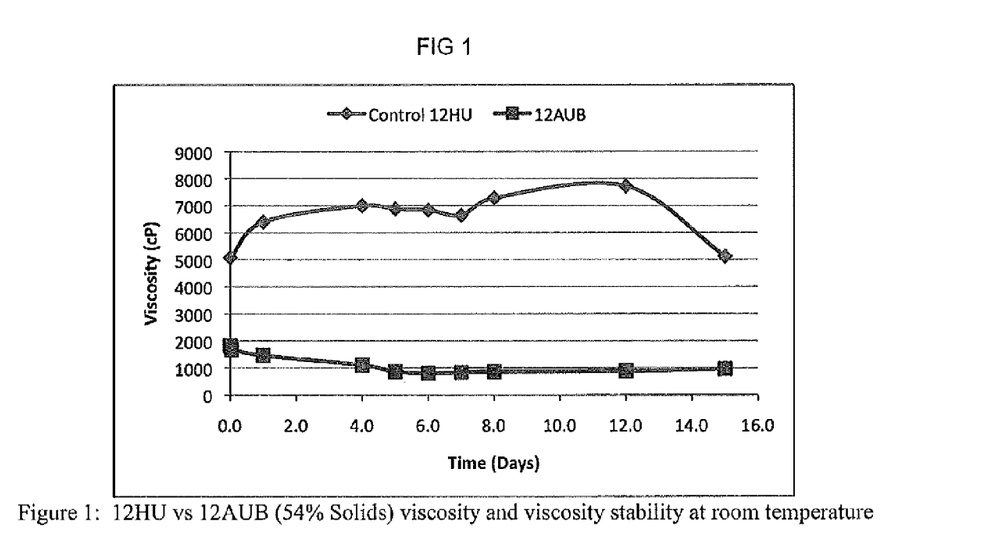
FIG. 1: 12HU (Example 2) Vs. 12AUB (Example 4) @54% Solids-viscosity and viscosity stability at room temperature.
Figure 2:
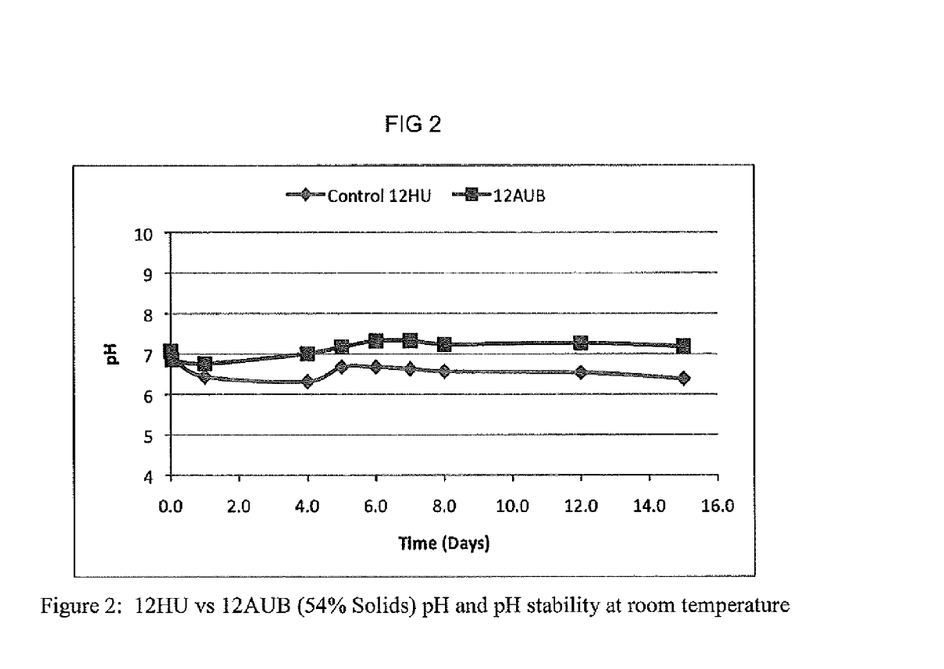
FIG. 2: 12HU (Example 2) Vs. 12AUB (Example 4) @54% Solids-pH and pH stability at room temperature.

The products produced in examples 2 and 4 are very similar in composition. The 12AUB-54 (Example 4) of this invention is significantly lower in viscosity than the control Example 2. Both show excellent pH stability over time indicating the resins are significantly free of urease in both examples. The ability to produce such a product without the use of heat is a significant improvement in adhesive technology. Moreover, the color of the 12AUB is much lighter than that of the control 12HU. FIGS. 1 and 2 (along with Tables 4 and 5) demonstrate the lower viscosity of the acid denatured Example 4, as well as, the excellent stability (both pH and viscosity) achieved by both processes. The excellent pH stability is indicative of a soy adhesive that is significantly free of urease. It should be noted that the initial decrease in viscosity observed with the Example 4 resin (12AUB) can be attributed to a reduction in foaming observed over the first several days. Once the foaming was gone, the viscosity was exceptionally stable and the viscosity was only 20% of the control example.

TABLE 4 pH and Viscosity of 12HU (Example 2)

| Days | Viscosity (cP) | pH |
|---|---|---|
| 0 | 5080 | 6.91 |
| 1 | 6400 | 6.44 |
| 4 | 7000 | 6.32 |
| 5 | 6880 | 6.68 |
| 6 | 6840 | 6.68 |
| 7 | 6640 | 6.63 |
| 8 | 7280 | 6.57 |
| 12 | 7720 | 6.54 |
| 15 | 5120 | 6.39 |

TABLE 5 pH and Viscosity of 12AUB (Example 4)

| Days | Viscosity (cP) | pH |
|---|---|---|
| 0.0 | 1820 | 7.07 |
| 0.04 | 1680 | 6.86 |
| 1.0 | 1460 | 6.76 |
| 4.0 | 1100 | 7.01 |
| 5.0 | 860 | 7.18 |
| 6.0 | 800 | 7.32 |
| 7.0 | 820 | 7.33 |
| 8.0 | 860 | 7.24 |
| 12.0 | 880 | 7.27 |
| 15.0 | 960 | 7.19 |

Example 5

Acid Denatured Adhesive—Soy/Urea=1:2 @ 60% Total Solids (12AUB-60)

The acid denaturing process affords products that are significantly lower in viscosity than previously used heat denaturing. This allows for even higher final solids products to be produced. In this example, a 60% solids adhesive is prepared in a manner similar to that described in Examples 2 and 3. A similar sample at 60% solids of the heat treated adhesive was so viscous that it could not be stirred. In this example, Advantage 357 was added to reduce the foaming tendency often observed when mixing soy flour. The acid denatured pH for this example was 3.5.

TABLE 6

Formula for Example 5

| Sequence | Ingredient | Amount (g) | Solids(g) | % to Soy |
|---|---|---|---|---|
| 01 | Water | 486.8 | | |
| 02 | Sodium bisulfite | 2.5 | 2.5 | 1.00 |
| 03 | Adv. 357 | 0.75 | 0.75 | |
| 04 | Soy Flour-90 | 263.2 | 250.0 | |
| 05 | $H_2SO_4$ (50%) | 28.7 | 14.3 | 5.7 |
| 06 | Urea | 500.0 | 500.0 | 200 |
| 07 | NaOH (50%) | 23.2 | 11.6 | 4.6 |
| Totals | | 1305.2 | 779.2 | |
| % Solids | | | 59.7 | |

Final Properties: pH=7.04, Viscosity=2340 cP (spindle #4)

Example 6

Acid Denatured Adhesive—Soy/Urea=1:2 @ 60% Total Solids (12ABU-60)

The order of addition of the urea or base has been shown to be significant in affecting the final viscosity. In this example, an adhesive similar to that in Example 5 was produced, but in this example the base was added to the acid denatured soy BEFORE the urea. The acid denatured pH for this example was 3.5.

TABLE 7

Formula for Example 6

| Sequence | Ingredient | Amount (g) | Solids(g) | % to Soy |
|---|---|---|---|---|
| 01 | Water | 486.8 | | |
| 02 | Sodium bisulfite | 2.5 | 2.5 | 1.00 |
| 03 | Adv. 357 | 0.75 | 0.75 | |
| 04 | Soy Flour-90 | 263.2 | 250.0 | |
| 05 | $H_2SO_4$ (50%) | 31.6 | 15.8 | 6.3 |
| 06 | NaOH (50%) | 21.1 | 10.5 | 4.2 |
| 07 | Urea | 500.0 | 500.0 | 200 |
| Totals | | 1306.0 | 781.6 | |
| % Solids | | | 59.8 | |

Final Properties: pH=7.37, Viscosity=1420 cP (spindle #4)

The comparison of Example 6 to Example 5 shows that when the urea is added after the base the final product will have an even lower viscosity; 1420 cP vs. 2340.

Example 7

Acid Denatured Adhesive—Soy/Urea=1:1 @ 50% Total Solids (11ABU-50)

The ability to produce an adhesive at higher solids, relative to the traditional heat treatment process, also affords the luxury of producing adhesives that are higher in soy content and lower in urea. This may be beneficial in properties and performance. In this example the soy:urea ratio was increased to 1:1. The process used was identical to that described in example 6. The acid denatured pH for this example was 3.5.

TABLE 8

Formula for Example 7

| Sequence | Ingredient | Amount (g) | Solids(g) | % to Soy |
|---|---|---|---|---|
| 01 | Water | 608.6 | | |
| 02 | Sodium bisulfite | 3.12 | 3.12 | 1.0 |
| 03 | Adv. 357 | 0.93 | 0.93 | |
| 04 | Soy Flour-90 | 328.9 | 312.5 | |
| 05 | $H_2SO_4$ (50%) | 32.5 | 16.2 | 5.2 |
| 06 | NaOH (50%) | 25.2 | 12.6 | 4.0 |
| 07 | Urea | 312.5 | 312.5 | 100 |
| Totals | | 1311.8 | 657.9 | |
| % Solids | | | 50.1 | |

Final Properties: pH=6.36, Viscosity=7880 cP (spindle #5)

Figure 3:
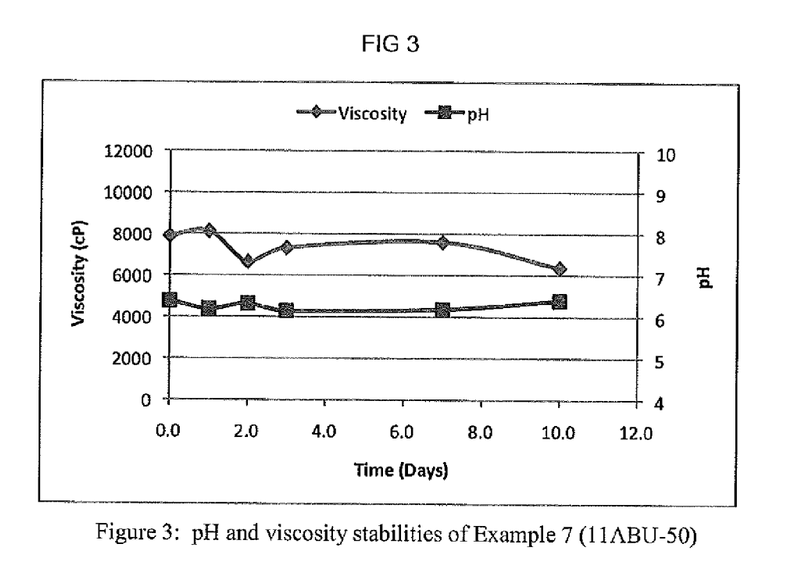
FIG. 3: pH and viscosity stabilities of Example 7 (11ABU-50)

The pH and viscosity stabilities of the high soy containing Example 7 are shown in FIG. 3 and Table 9. These results further demonstrate the excellent practicality and simplicity of this process to produce stable soy/urea adhesives that are significantly free of urease activity.

TABLE 9 pH and Viscosity of 11ABU-50 (Example 7)

| Days | Viscosity (cP) | pH |
|---|---|---|
| 0 | 7880 | 6.38 |
| 1 | 8120 | 6.19 |

TABLE 9-continued pH and Viscosity of 11ABU-50 (Example 7)

| Days | Viscosity (cP) | pH |
|---|---|---|
| 2 | 6640 | 6.32 |
| 3 | 7320 | 6.14 |
| 7 | 7600 | 6.18 |
| 10 | 6360 | 6.39 |

Example 8

Acid Denatured Adhesive—Soy/Urea=1:1 @ 40% Total Solids (11AU-40)

In some formulations, very low viscosities and high soy content may be desirable. Furthermore, the need for a lower pH product may be required if certain base sensitive crosslinkers are selected. In this example a lower solids (40%) product was prepared and the base step was eliminated. The process used was similar to that described in Example 3. The acid denatured pH for this example was 3.0.

TABLE 10

Formula for Example 8

| Sequence | Ingredient | Amount (g) | Solids | % to Soy |
|---|---|---|---|---|
| 01 | Water | 344.2 | | |
| 02 | Sodium bisulfite | 1.15 | 1.15 | |
| 03 | Adv. 357 | 0.50 | 0.50 | |
| 04 | Soy Flour-90 | 121.0 | 115.0 | |
| 05 | $H_2SO_4$ (50%) | 14.0 | 7.0 | 6.1 |
| 06 | Urea | 115.0 | 115.0 | |
| Totals | | 595.85 | 238.7 | |
| % Solids | | | 40.1 | |

Final Properties: pH=3.51, Viscosity=600 cP (spindle #5)

Crosslinking Incorporation and Adhesive Performance

Examples 3-8 describe the process to produce novel acid denatured soy/urea adhesives. Examples 9-11 demonstrate the efficacy of adding crosslinkers, PAE and pMDI respectfully, to these adhesive to improve performance. Examples 12-17 demonstrate the adhesive strength of these acid denatured soy/urea adhesives with and without crosslinking agent addition using the described ABES wet and dry strength evaluation.

Examples 9-11

Acid Denatured Soy/Urea Adhesive Combined with PAE or pMDI

The crosslinking agent, PAE (CA-1300) or pMDI, was added on a dry parts of crosslinker to 100 parts of dry soy/urea adhesive at room temperature, with modest agitation in a 150 mL beaker using a jiffy mixing blade and an overhead stirrer. After the crosslinking agent was added, the mixture was allowed to stir for 1-5 minutes with modest agitation.

TABLE 11

Acid Denatured Soy/Urea Adhesives Combined with Crosslinking Agents

| Example | Base Adh. | Adh. Ex. | X-link (pph) | Solids (%) | pH | Visc. (cP) |
|---|---|---|---|---|---|---|
| 9 | 11ABU-50 | 7 | PAE (20) | 45.0 | 5.9 | 2,560 |
| 10 | 11AU-40 | 8 | pMDI (50) | 50.0 | 3.4 | 1,500 |
| 11 | 11AU-40 | 8 | pMDI (100) | 57.1 | — | 2,000 |

Figure 4:
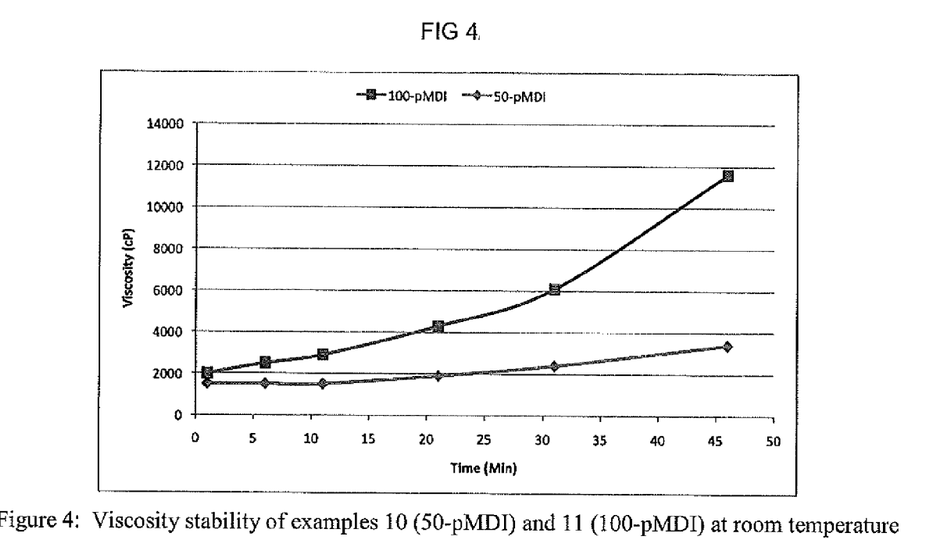
FIG. 4: Viscosity stability of Examples 10 (50-pMDI) and 11 (100-pMDI) at room temperature

The viscosity stability of Example 9 was observed to be excellent for several hours, as expected from previous PAE-soy blends and the viscosity stabilities of Examples 10 and 11 are shown in FIG. 4 and Table 12. The use of pMDI with a compatible aqueous system is expected to be very reactive and the viscosity stability shown in these examples is considered very acceptable for blend and use applications. For heat denatured resins, similar to Example 2, the stability is less than 5 minutes before complete gelation occurs.

TABLE 12

Viscosity Stability of Example 10 (50-pMDI) and Example 11 (100-pMDI)

| Time | 50-pMDI Viscosity (cP) | 100-pMDI Viscosity (cP) |
|---|---|---|
| 1 | 1500 | 2000 |
| 6 | 1500 | 2500 |
| 11 | 1500 | 2900 |
| 21 | 1900 | 4300 |
| 31 | 2400 | 6100 |
| 46 | 3400 | 11600 |

Example 12-17

Acid Denatured Soy/Urea Adhesive Combined with PAE and pMDI

TABLE 13

Strength of Adhesives w/and w/o Crosslinking Agents

| | | | | ABES Strength (N) | |
|---|---|---|---|---|---|
| Example | Adh. | Adh. Ex. | X-link (pph) | DRY | WET |
| 12 | 12HU | 2 | PAE (20) | 593 | 263 |
| 13 | 12AUB | 4 | 0 | 194 | 0 |
| 14 | | 4 | PAE (20) | 574 | 199 |
| 15 | 11ABU | 7 | 0 | 342 | 0 |
| 16 | | 7 | PAE (20) | 589 | 208 |
| 17 | | 7 | pMDI (67) | 672 | 327 |

The results from Table 13 show that all of the adhesives evaluated showed good to excellent dry bond strengths. However, in all base adhesives, the addition of a crosslinker was required to afford any appreciable wet strength per our ABES method. Interestingly, the addition of pMDI showed the greatest improvement in wet strength, perhaps due to a greater amount of crosslinker being added.

Figure 5:
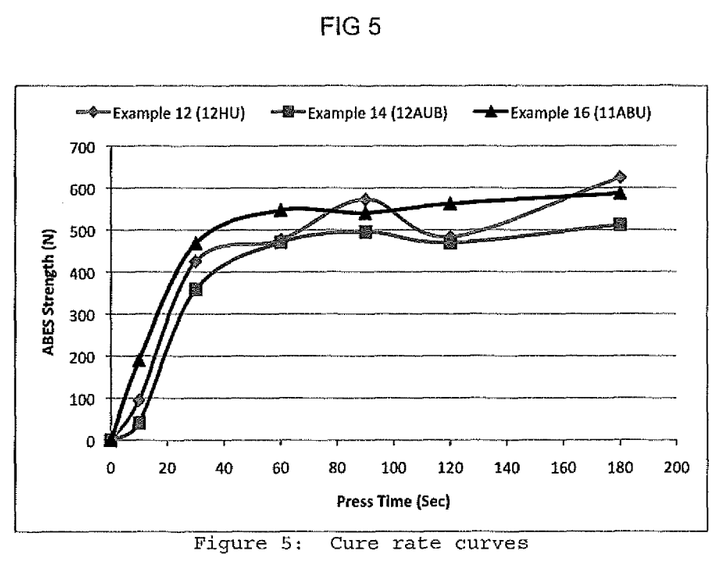
FIG. 5: Cure rate curves of Example 12, 14 and 16.

The curing rate, as measured using the ABES strength development procedure, shows the development of bond strength over time when subjected to heat in a press. FIG. 5 (with data in Table 14) shows a comparison of Examples 12, 14 and 16. Examples 12 and 14 follow a similar trend, suggesting comparable reactivity between the two products, while example 16 showcases the ability to produce higher soy containing adhesives at appreciably higher solids (50% for the acid denatured process vs. 38% for the heat denatured process) and how this results in faster curing (strength after only 10 seconds of press time) thermosetting adhesives to be produced.

TABLE 14

ABES Curing Rate Curves

| | ABES Strength (N) | | |
|---|---|---|---|
| | Ex. 12 | Ex. 14 | Ex. 16 |
| 0 | 0 | 0 | 0 |
| 10 | 95 | 41 | 190 |
| 30 | 425 | 358 | 468 |
| 60 | 476 | 470 | 547 |
| 90 | 573 | 495 | 540 |
| 120 | 484 | 469 | 562 |
| 180 | 625 | 512 | 587 |

In Examples 18-20 Adhesives were produced to make particleboard panels. The panels produced are Examples 21 and 22. The particleboard panels of Examples 21 and 22 were made following the "Particleboard Procedure" described above. This demonstrates the utility of the technology.

Example 18

Comparative Product Via "Heat Denaturing"

Production of 11HU-30PAE was conducted as follows. PAE used was CA1300. This was produced per the procedure previously described by Wescott (U.S. application Ser. No. 11/779,558)

TABLE 15

Formula for Example 18

| Sequence | Ingredient | Amount (g) | Solids (g) | % to Soy + Diluent |
|---|---|---|---|---|
| 01 | CA1300 | 203.9 | 61.2 | 30.2 |
| 02 | Water | 299.5 | | |
| 03 | NaHSO$_3$ | 0.5 | 0.5 | |
| 04 | Soy Flour-TS | 106.6 | 101.3 | |
| 05 | Urea | 101.3 | 101.3 | |
| Totals | | 711.8 | 264.3 | |
| % Solids | | | 37.1 | |

Water was combined with Soy Flour-TS (toasted soy flour) in a three-neck round bottom flask with overhead stirring, thermocouple and condenser. The mixture was heated to 83±1° C. and held for 60 minutes. The reaction was then removed from heat and urea was added, resulting in a rapid cooling to 50° C. The mixture was held at 50° C. for 15 minutes and then cooled to room temperature on an ice/water bath. The PAE (CA1300) was then added and the mixture was stirred for 15 minutes and used immediately. The final adhesive had the following properties:
pH: 6.17
Viscosity (RVT #5 10 RPM): 3200 cP

Example 19

Acid Denatured Product

Production of 11AU-30PAE was conducted as follows. PAE used was CA1300.

TABLE 16

Formula for Example 19

| Sequence | Ingredient | Amount (g) | Solids (g) | % to Soy + Diluent |
|---|---|---|---|---|
| 01 | CA1300 | 197.5 | 59.3 | 30.7 |
| 02 | Water | 230.0 | | |
| 03 | NaHSO$_3$ | 1.0 | 1.0 | |
| 04 | Soy Flour-90 | 101.6 | 96.5 | |
| 05 | 46.5% H$_2$SO$_4$ | 9.7 | 4.5 | |
| 06 | Urea | 96.5 | 96.5 | |
| Totals | | 636.3 | 257.8 | |
| % Solids | | | 40.5 | |

Water was combined with SMBS (viscosity modifier) and Soy Flour-90 (untoasted soy flour) in a metal beaker with overhead stirring. Sulfuric acid was added and the mixture was stirred for 30 minutes. The urea was added to the mixture the product was stirred for 30 minutes. The PAE (CA1300) was then added and the mixture was stirred for 15 minutes and used immediately. The final adhesive had the following properties:

pH: 4.04
Viscosity (RVT #5 10 RPM): 6140 cP

Example 20

Non Urea Containing, Non Denatured Product (for Use as the Core Resin)

Production of 12G-20PAE was conducted as follows. PAE used was CA1300. (Reference Brady—U.S. patent application Ser. No. 12/287,394).

TABLE 17

Formula for Example 20

| Sequence | Ingredient | Amount (g) | Solids (g) | % to Soy + Diluent |
|---|---|---|---|---|
| 01 | CA1300 | 213.6 | 64.1 | 20.0 |
| 02 | Water | 159.5 | | |
| 03 | Soy Flour-20 | 112.4 | 106.8 | |
| 04 | Glycerol | 213.6 | 213.6 | |
| Totals | | 699.1 | 384.5 | |
| % Solids | | | 55.0 | |

Water was combined with Soy Flour-20 (toasted soy flour) in a three-neck round bottom flask with overhead stirring. The mixture was stirred for 30 minutes. The PAE (CA1300) was then added and the mixture was stirred for 15 minutes and used immediately. The final adhesive had the following properties:

pH: 6.08
Viscosity (RVT #3 10 RPM): 1850 cP

Examples 21 & 22

Two lab particleboard panels were made and tested using the Particleboard Procedure described above. Results are shown in Table 18. These panels had used either Example 18 or Example 19 as a face adhesive and both used Example 20 as a core adhesive. These panels showed excellent performance characteristics and rapid cure. The panels showed excellent MOR and MOE values and modest internal bond values (IB). The MOR, typically dominated by the face adhesive, shows that the acid treated product yields better properties (both strength and solids/viscosity) than the heat denatured product, thus adding to the utility of the invention. In addition, the acid treated product (Example 19) was significantly lighter in color. These panels are excellent no added formaldehyde (NAF) particleboard prototypes which have great commercial practicality.

TABLE 18

Particleboard Panel Results

| Example # | Face Adhesive Used | Press Temp (° C.) | Press Time* | Face Mat MC (%) | Core Mat MC (%) | IB (PSI) | MOR at 46.0 lb/ft3 (PSI) | MOE (PSI) |
|---|---|---|---|---|---|---|---|---|
| 21 | Example 18 | 170 | 60 | 14.2 | 7.7 | 59.8 | 1828 | 2.63E+05 |
| 22 | Example 19 | 170 | 60 | 13.6 | 7.7 | 56.5 | 2007 | 3.78E+05 |

*Seconds after core reaches 100° C.

Blends with PVAc (polyvinyl acetate)

Example 23

Compatibility with PVAc

Samples of 11AU were blended with PVAc obtained from Franklin International (Columbus, Ohio). The type of PVAc used was Duracet 12. Samples were checked for viscosity, pH and any sign of disrupting of the PVAc emulsion.

TABLE 19

Formula for Example 23 (11AU)

| Sequence | Ingredient | Amount (g) | Solids (g) |
|---|---|---|---|
| 01 | Water | 272.2 | |
| 02 | NaHSO$_3$ | 1.1 | 1.1 |
| 03 | Soy Flour-90 | 118.4 | 112.5 |
| 04 | 46.5% H$_2$SO$_4$ | 10.1 | 4.7 |
| 05 | Urea | 112.5 | 112.5 |
| Totals | | 514.8 | 231.7 |
| % Solids | | | 45.0 |

Water was combined with SMBS (viscosity modifier) and Soy Flour-90 (untoasted soy flour) in a metal beaker with overhead stirring. Sulfuric acid was added bringing the pH to 3.53 and the mixture was stirred for 30 minutes. The urea was added to the mixture the product was stirred for 15 minutes. The final adhesive had the following properties:

pH: 4.19
Viscosity (RVT #5 10 RPM): 2370 cP

Example 24

Blends with PVAc and 11AU

Blends were prepared by mixing 11AU from Example 23 above with PVAc at varying ratios to show compatibility of the two products. Four levels of blending were chosen to show the broad range of mixtures possible. In all cases, the PVAc was placed in a 200 mL beaker and 11AU (Example 23) was added. The mixture was stirred for 1 min and the viscosity/pH data was obtained. Furthermore, for all the blends, the two components were highly compatible and showed no signs of separation, precipitation or settling. Table 20 shows the data.

TABLE 20

Data for PVAc/11AU Blends

| Name | % 11AU (solids/solids) | pH | Visc (cP) | Solids (%) |
|---|---|---|---|---|
| PVAc Control | 0 | 3.60 | 1040 | 56.7 |
| PVAc:11AU (4:1) | 20.0 | 3.95 | 690 | 53.9 |
| PVAc:11AU (2:1) | 33.3 | 4.03 | 1180 | 52.3 |
| PVAc:11AU (1:1) | 50.0 | 4.08 | 2240 | 50.2 |
| PVAc:11AU (1:2) | 66.7 | 4.11 | 2110 | 48.3 |
| PVAc:11AU (1:4) | 80.0 | 4.17 | 2410 | 46.9 |
| 11AU Control | 100 | 4.19 | 2370 | 45.0 |

It should be noted that the above description, attached figures and their descriptions are intended to be illustrative and not limiting of this invention. Many themes and variations of this invention will be suggested to one skilled in this art, in light of the disclosure. All such themes and variations are within the contemplation hereof. For instance, while this invention has been described in conjunction with the various exemplary embodiments outlined above, various alternatives, modifications, variations, improvements, and/or substantial equivalents, whether known or that are, or may be presently unforeseen, may become apparent to those having at least ordinary skill in the art. Various changes may be made without departing from the spirit and scope of the invention. Therefore, the invention is intended to embrace all known or later-developed alternatives, modifications, variations, improvements, and/or substantial equivalents of these exemplary embodiments.

We claim:

1. A stable adhesive composition comprised of urea and soy flour in water wherein the urease present in the soy flour has been deactivated by an acid treatment, wherein the acid treatment comprises lowering the pH of the dispersed soy flour to less than 4.5 and greater than 2.0 for a period of at least 1 minute prior to combining it with urea; wherein the urea is present in the composition in an amount equivalent to at most five pails urea by weight for every one part by weight soy flour.

2. The composition of claim 1 further comprising a crosslinking agent.

3. The composition of claim 2 wherein the amount of the crosslinking agent in the composition is 0.1 to 80% solids based on the dry weight of total adhesive.

4. The composition of claim 2 wherein the crosslinking agent comprises a formaldehyde-free crosslinking agent selected from the group consisting of isocyanate, polyamine epichlorohydrin resin, polyamidoamine-epichlorohydrin resin, polyalkylene polyamine-epichlorohydrin, amine polymer-epichlorohydrin resin epoxy, aldehyde, aldehyde starch, dialdehyde starch, glyoxal, urea glyoxal, urea-aldehyde resin and mixtures thereof.

5. The composition of claim 2 wherein the crosslinking agent comprises an isocyanate.

6. The composition of claim 2 wherein the crosslinking agent comprises a polyamidoamine-epichlorohydrin resin.

7. The composition of claim 2 wherein the crosslinking agent comprises a formaldehyde-containing crosslinking agent selected from the group consisting of formaldehyde, phenol formaldehyde, melamine formaldehyde, urea formaldehyde, melamine urea formaldehyde, phenol resorcinol formaldehyde and any combination thereof.

8. The composition of claim 1 further comprising an emulsion polymer.

9. The composition of claim 8 wherein the amount of the emulsion polymer in the composition is from 0.1 to 80% by dry weight based on the dry weight of total adhesive.

10. The composition of claim 8 wherein the emulsion polymer comprises a polyvinyl acetate (PVAc).

11. The composition of claim 1 further comprising a diluent.

12. The composition of claim 1, wherein the diluent is selected from the group consisting of glycerol, ethylene glycol, propylene glycol, neopentyl glycol and polymeric versions thereof.

13. A method of making the stable adhesive of claim 1, the method comprising the steps of
  a) dispersing soy flour in water
  b) lowering the pH of the dispersed soy flour to at least 4.5, but greater than 2.0 for a period of at least 1 minute to deactivate the urease,
  c) contacting the dispersed soy flour with urea, and
wherein the urea is added to the soy flour in an amount equivalent to at most five parts urea for every one part soy flour.

14. The method of claim 13 wherein the urea is added to the soy flour after the soy flour is substantially free of urease.

15. The method of claim 13 further comprising the step of adding an emulsion polymer.

16. The method of claim 13 wherein the amount of the emulsion polymer added is from 0.1 to 80% by dry weight based on the dry weight of total adhesive.

17. The method of claim 13 further comprising the step of adding a diluent.

18. The method of claim 13 further comprising the step of adding a crosslinking agent.

* * * * *